(12) United States Patent
Bergström et al.

(10) Patent No.: US 6,262,177 B1
(45) Date of Patent: Jul. 17, 2001

(54) PROCESS FOR PREPARING POLYACRYLATE/POLYOLEFIN BLENDS

(75) Inventors: Christer Bergström; Tomi Heiskanen, both of Espoo (FI)

(73) Assignee: Optatech Corporation, Espoo (FI)

( * ) Notice: Subject to any disclaimer, the term of this patent is extended or adjusted under 35 U.S.C. 154(b) by 0 days.

(21) Appl. No.: 09/424,466

(22) PCT Filed: May 22, 1998

(86) PCT No.: PCT/FI98/00430

§ 371 Date: Dec. 14, 1999

§ 102(e) Date: Dec. 14, 1999

(87) PCT Pub. No.: WO98/54254

PCT Pub. Date: Dec. 3, 1998

(30) Foreign Application Priority Data

May 27, 1997 (FI) .......................................... 972242

(51) Int. Cl.[7] ................ C08F 8/00; C08L 9/00; C08L 23/00; C08L 33/04; C08L 35/02
(52) U.S. Cl. ............... 525/191; 525/222; 525/232; 525/240
(58) Field of Search ..................... 525/191, 222, 525/232, 240

(56) References Cited

U.S. PATENT DOCUMENTS

| 4,710,544 | 12/1987 | Wolfe, Jr. . | |
| 5,300,578 | * 4/1994 | Vestberg et al. | 525/252 |
| 5,889,118 | * 3/1999 | Delgado et al. | 525/228 |

FOREIGN PATENT DOCUMENTS

| 0 247 580 | 12/1987 | (EP) . |
| 0 312 664 | 4/1989 | (EP) . |
| 0 554 058 | 8/1993 | (EP) . |
| WO 96/12745 | 5/1996 | (WO) . |
| WO 96/20228 | 7/1996 | (WO) . |

* cited by examiner

*Primary Examiner*—Nathan M. Nutter
(74) *Attorney, Agent, or Firm*—Cohen, Pontani, Lieberman & Pavane

(57) ABSTRACT

Disclosed is a process for producing a polymer blend wherein a first phase containing a polyacrylate polymer prepared by radical polymerization and a source of radicals, and a second phase containing a polyolefin polymer are compounded by melt processing.

25 Claims, No Drawings

PROCESS FOR PREPARING POLYACRYLATE/POLYOLEFIN BLENDS

This application is the U.S. application based on PCT application No. PCT/FI98/00430, filed May 22, 1998, which claims priority from Application 972242 filed in Finland on May 27, 1997.

BACKGROUND OF THE INVENTION

1. Field of the Invention

The present invention relates to polymeric blends. In particular the invention relates to methods of producing melt-processable multiphase thermoplastic compositions comprising a crystalline polyolefin resin and a cross-linked polyacrylate containing chemically functional groups.

2. Description of Related Art

Blends of plastics and elastomers are well-known in the art. Since the polymer phases of such blends are generally not compatible with each other, the resulting conventional compositions have poor physical properties. Therefore, blends of non-polar plastics and polar elastomers, such as those disclosed in U.S. Pat. Nos. 4,555,546 (granted Nov. 26, 1985 to Monsanto), and 4,782,110 (granted Nov. 1, 1988 to DuPont), normally require incorporation of a compatibilizing agent for obtaining satisfactory physical properties. The addition of such compatibilizing agents, however, adds to the expense of the blend and complicates the manufacturing process. Certain compatibilizing agents and curatives will also contribute colour to the composition.

Furthermore, when the elastomer component of blends of the above kind is uncured, the blend has high compression set and high oil swell.

An additional problem related to the multiphase thermoplastic compositions described in the above patents resides in the fact that the most desirable polar elastomers are only available in the form of large sticky chunks rather than the free-flowing pellets used for feeding conventional compounding extrusion equipment. As a result, the process for manufacturing these multiphase thermoplastic compositions uses expensive batch mixing rubber compounding equipment. Alternatively, an expensive cryogenic grinding process has to be employed to convert the sticky chunks of raw rubber to a fine powder that can be made free-flowing by the addition of a partitioning agent.

In addition to compatibilizers, crosslinking agents (other than peroxides) have also been used in attempts to crosslink the polyacrylate phase by reacting the functionality of an ethylene/acrylate copolymer with a diamine (U.S. Pat. No. 4,782,110). So far these agents appear to be rather ineffective.

In addition to the above-mentioned traditional blends, known in the art are also single free-flowing pellets consisting of melt-processible multiphase thermoplastic compositions made up of intimate homogeneous blends of polyolefins and polyacrylate elastomers. According to the teaching of U.S. Pat. No. 5,300,578, these blends can be produced by polymerizing liquid monomeric units of the acrylate component into solid elastomeric polar polymer within the pellet structure of the polyolefin component. This free radical polymerization process occurs at relatively low temperature and under low mechanical shear conditions to provide an intimate homogeneous mixture of the components in the form of a free-flowing pellet.

Although compositions of the last-mentioned kind represent a clear improvement over the prior art, tensile strength, elongation and, in particular, compression set resistance of these known blends are still unsatisfactory.

SUMMARY OF THE INVENTION

It is an object of the present invention to eliminate the problems associated with the prior art and to provide a novel process for improving the elastomeric properties of polyacrylate/polyolefin blends. In particular, it is an object of the invention to provide compounded blends with regard to excellent elastomeric properties without the use of compatibilizing additives known in the art.

It is another object of the present invention to provide thermoplastic elastomer compositions having excellent oil swell resistance and tensile strength, while at the same time the having adequate elongation, tear resistance, and compression set resistance.

These and other objects, together with the advantages thereof over known thermoplastic elastomer compositions of polyolefin resins and crosslinked polyacrylates and processes for preparing such compositions, which shall become apparent from the specification which follows, are accomplished by the invention as hereinafter described and claimed.

The present invention is based on modification of the crosslink density of the polyacrylate phase during shear compounding of the blend. Pellets of the above-mentioned kind (U.S. Pat. No. 5,300,578) as well as other conventional blends of polyacrylates prepared by radical mechanism and polyolefins contain a source of radicals, in particular of free radicals, which are subjected to termination reactions when the blends are heated and compounded in the melt phase. These reactions will decrease the number of radicals rapidly. The source of radicals is in particular constituted by residual free radicals themselves or by peroxides (substances containing peroxy groups) left in the polyacrylate phase after polymerization. The free radicals can thus be present in the polyacrylate before compounding, or they can be formed from the peroxides as a result of heating during compounding.

According to the present invention, it has now been found that by retarding the termination reactions and, thus, prolonging the life time of the radicals, an increased number of cross-links can be formed within the polyacrylate phase of the blends during compounding. As a result of the increased number of crosslinks, the mechanical properties, in particular the elastomeric properties, of the compounded blends are greatly improved.

Further, by blending crystalline polymers with elastomers and by compounding the blends as described above, permanent interfacial bonds can be generated so as to make the components more compatible with each other.

More specifically, the process according to the invention for improving the elastomeric properties of polyacrylate/polyolefin blends comprises retarding the termination reactions of free radicals from the source of free radicals during compounding in order to promote formation of crosslinks in the polyacrylate phase.

Considerable advantages are achieved by the present invention. Thus, the invention will eliminate the complications associated with handling sticky chunks of uncured elastomer, since the free-flowing feedstock contains the polar elastomer polymerized in situ within the pores of the polyolefin.

The improved properties of the present compounded blends include high tensile strength, elongation, tear resistance, flexibility fatigue resistance, compression set resistance, adequate high and low temperature properties, and high oil resistance. Excellent weatherability and absence of halogenated components are also desirable attributes of the present thermoplastic compositions.

Prior art describing thermoplastic elastomer compositions based on polypropylene continuous phase deliberately avoids the use of peroxide to crosslink the elastomer phase. This is because of the detrimental effect of free radical attack on the polypropylene polymer structure. The present invention requires the use of peroxide (free radical) crosslinking of the elastomeric phase, yet avoids any simultaneous detrimental impact on the polypropylene phase.

From an economic standpoint, it is important that the thermoplastic compositions are easily processible on thermoplastic equipment, and that scrap material of the thermoplastic compositions can be reground and reprocessed with substantially no significant change in the physical properties of the thermoplastic composition.

The invention will be described more closely with the aid of the following detailed description and with reference to a number of non-limiting working examples.

DESCRIPTION OF THE PREFERRED EMBODIMENT

Definitions

Within the scope of the present invention, "polymer blends" denotes physical mixtures of two or more (neat) polymers, if desired mixed with suitable additives and adjuvants.

Polymer blends do not form single-phase systems in material processing and application conditions and their properties depend on the dispersion of the components and are usually linked to the arithmetic average of the values of the components.

The term "compounds" designates polymer blends typically also containing additives and adjuvants, which have been melt compounded into a homogeneous mixture, which can be used for (melt) processing into the desired polymer product. "Compounding" of the blends is preferably carried out by subjecting the blends to shear forces in the melt phase.

The "source of radicals" comprises any substance or material capable of forming or generating radicals during compounding of a polymer blend (free radical generator). As disclosed in the examples, radicals can be generated by peroxides left in the acrylate phase after the radical polymerization. These peroxides include diperoxides, peroxy esters and hydrogen peroxide and similar substances containing a —O—O— bond. Similar radicals can also be formed from substances containing diazo groups and other similar radical generators used during radical polymerization of acrylate monomers.

However, the "source of radicals" can be formed by the polymers themselves which are decomposed when subjected to heat or radiation (for example Electron Beam or Ultra Violet), thus generating free radicals in the blend. Furthermore, the "source of radicals" can comprise any free radicals left in the acrylate phase after polymerization as well as materials separately added to the polymer blend after or during blending and capable of forming radicals such as additives used in connection with EB or UV radiation treatment of polymer blends.

"Peroxide accelerator" means a substance capable of interacting in an additive manner with peroxide-generated free radicals to form highly reactive, multiple, secondary free radical sites which lead to the accelerated creation of highly crosslinked eleastomeric matrix.

"Interfacial agents" are materials capable of promoting the compatibility of and the interfacial adhesion between the elastomeric and thermoplastic components of the blend.

The Starting Materials

The polymer blends according to the present invention comprise a first phase containing a polyacrylate polymer and a second phase containing a polyolefin polymer. According to a particularly preferred embodiment, the composition of the present blends is such that A. 15–75 parts by weight is formed by a polyolefin comprising polymerized monomer units of ethylene or propylene or mixtures thereof forming the continuous phase of the composition and, B 25–85 parts by weight is constituted by a partially crosslinked polyacrylate elastomer forming the discontinuous phase.

In particular, the blends contain 60 to 20 parts by weight of a polyolefin and 40 to 80 parts by weight of a polyacrylate.

The polyolefin phase can be formed by any suitable polyolefin, in particular homo- or copolymers of ethylene and propylene. Polybutylene, polyisobutylene, poly(4-methyl-1-pentylene), including copolymers of ethylene and propylene (EPM, EPDM) are examples of other polyolefins. The polyolefin phase forms the matrix or continuous phase of the blends, in which the elastomer phase is embedded.

The elastomer phase typically contains units derived from (a) an alkyl ester of acrylic or methacrylic acid, wherein the alkyl group contains 1–10 carbon atoms, and (b) a chemically functionalized acrylate or methacrylate.

As specific examples of units of group (a) above, the lower alkyl ($C_{1-4}$ alkyl) acrylates, in particular butylacrylate can be mentioned. 2-hydroxy ethyl acrylate and 2-tert-butyl amino-ethyl methacrylate, preferably glycidyl methacrylate, are examples of units of group (b).

A particularly preferred elastomeric component comprises a polymer derived from n-butyl acrylate monomers and containing a small amount of glycidyl methacrylate units.

The present blends can be produced by methods known per se, e.g. by mixing the polymer components in the desired weight relationship using a batch or a continuous process. As examples of typical batch mixers, the Banbury and the heated roll mill can be mentioned. Continuous mixers are exemplified by the Farrel mixer, the Buss co-kneader, and single- or twin-screw extruders.

However, according to a preferred embodiment of the present invention, the blends are produced as single free-flowing pellets according to the process of U.S. Pat. No. 5,300,578 by polymerizing monomeric acrylic acid units into a solid elastomeric polar polymer within a polyolefin in the form of a pellet. In order to polymerize the acrylic acid units in the polyolefin matrix, the acrylic acid monomers are fed into the pellets together with a radical initiator, preferably a peroxide. As specific examples of peroxides, Triganox 145—a peroxide which has a half life of 10 hours at 120° C. The obtained pellet, known as a Pacrel pellet, contains the polymer components in the initial weight ratios of the reactants. There are still left significant amounts of residual unreacted peroxide in the acrylate phase. The Pacrel pellets are commercially available and typically contain about 20 to 60 parts by weight of polypropylene and 80 to 40 parts by weight of polyacrylate.

The peroxide accelerators and compatibilizers are commercially available products.

Modification of Crosslink Density of the Polyacrylate Phase

According to the present invention, during shear compounding of the above-mentioned polymer blends, the termination reactions of the residual unreacted (peroxide) radicals are retarded in order to promote formation of crosslinks in the polyacrylate phase. In particular, the termination of the radicals can be retarded by introducing a polar peroxide accelerator into the blend formed by the first and the second polymer phase before melt blending thereof. A typical peroxide accelerator is N,N' m-phenylene dimaleimide (HVA-2), which will interact with the peroxide at the high compounding temperature to generate an increased number of crosslinks in the polyacrylate phase. This, in turn, leads to high elongation and improved compression set resistance. These features are illustrated by the Examples, and in the present context reference is made to the content of Table 1, wherein the influence of HVA-2 on the properties of Pacrel pellet based blends is examined.

Examples of other suitable polar peroxide accelerators are trimethylolpropane trimethacrylate, ethylene glycol dimethacrylate, and zinc diacrylate. Other non-polar peroxide accelerators include 1,2-polybutadiene, 1,2-polybutadiene/Styrene copolymer, triallylcyanurate, triallylisocyanurate, and triallylmellitate.

The peroxide accelerator is added in an amount of 0.1 to 15, in particular 0.2 to 5, preferably about 0.5 to 2 parts per hundred parts of the rubber (PHR) component of the polymer blend, preferably about 0.5 to 2%. calculated from the weight of the rubber content. It can be mixed (e.g. dry blended) with the other components of the polymer blend before compounding.

As mentioned above, attempts to crosslink the polyacrylate phase by reacting ethylene/acrylate copolymers with a diamines (U.S. Pat. No. 4,782,110) have been shown to be ineffective. In fact, the use of a well-known diamine (hexamethylenediamine carbamate—Diak #1) as a crosslinking agent in the presence of a peroxide accelerator leads to deterioration of the thermoplastic compositions physical properties. This is also evidenced by the results obtained with Examples 2-7-1 and 2-8 in Table 3.

Interfacial Linkage—Creation of Compatibility between the Polyacrylate and Polyolefin Phases There is a secondary unexpected and useful contribution of the peroxide accelerator in that it appears to simultaneously create covalent interfacial grafting linkages between the polar polyacrylate phase and the non-polar polypropylene continuous phase (see Example 1-7, Table 1), resulting in a decrease of melt flow and an increase in elongation. An attractive balance of high tear resistance and excellent flex durability in the high temperature shear compounded Pacrel is also achieved when the peroxide accelerator is combined with an acid, anhydride or epoxy functionalized, polypropylene-compatible polyolefin (see Example 2-13, Table 4, Examples 1-6, 1-9, 2-; 15, Table 5, and Example 2-14, Table 6).

This is an indication that permanent interfacial bonding has occurred between the polypropylene and polyacrylate phases. That these two normally incompatible phases have been "compatibilized".

The HVA-2 is probably enabling the interaction of the polyolefin functionality with the epoxy functionality of the polyacrylate phase using free radicals generated from residual peroxide from the polyacrylate phase. The functionalized polyolefin is introduced into the blend formed by the first and the second polymer before melt blending thereof.

In contrast, attempts to generate interfacial adhesion (grafting) between the glycidyl methacrylate-functionalized polyacrylate phase and the polypropylene by the addition of a polypropylene-compatible, acid functionalized polypropylene (Polybond 1002) and using diamine grafting systems described in U.S. Pat. No. 4,555,546 have not been successful (see low elongation data in Table 2).

Thus, the melt processible multiphase thermoplastic composition of this invention can be prepared by mixing and shearing this single Pacrel pellet above the melting point of the polyolefin the presence of a peroxide accelerator to complete the crosslinking of the polyacrylate phase, create interfacial adhesion between the polyolefin and the polyacrylate, and disperse the elastomer phase as non-continuous discrete particles throughout the continuous polyolefin matrix.

Preferred interfacial agents are polyolefins which are compatible with polypropylene and contain functional groups which are capable of reacting with functional groups in the polyacrylate phase. Thus, the polyolefin contains functional groups selected from the group of acid, acid anhydride and epoxy groups, which are capable of reacting with acid, acid anhydride and epoxy groups, respectively, of the polyacrylate phase. As an example, a combination can be mentioned wherein the polyacrylate phase contains glycidyl acrylate or glycidyl methacrylate groups and the interfacial agent contains maleic anhydride groups.

A particularly preferred compatibilizer is an ethylene-acrylate-co/terpolymer containing alkyl acrylate units, ethylene units and reactive epoxy groups.

The compatibilizer is added in an amount of 0.1 to 15%, preferably 1 to 10%, calculated from the weight of the polymer blend.

Processing of the Polymer Blends

The resultant multiphase thermoplastic composition can be formed into various shapes by compression molding, injection molding, blow molding and extrusion having attractive thermoplastic elastomer performance.

Before processing, plastic additives known per se can be added to the polymer blend according to the invention. These additives comprise, for instance, pigments, stabilizers, colouring agents, lubricants, antistatic agents, fillers and fire retardants. If desired, these substances can be premixed with, e.g., the polyolefin polymer before forming the polymer blend. The amounts of polymer additives are typically about 0.01 to 50%, preferably about 10 to 35% of the weight of the total thermoplastic elastomer composition.

The compounds according to the invention are processed according to methods known per se in polymer technology to manufacture the final products.

As a result, thermoplastic elastomer compositions are obtained having good elastomeric characteristics and stress strain properties. Particularly valuable results are obtained with the combination of N,N'-m-phenylenedimaleimide and an ethylene-alkylacrylate-maleic anhydride terpolymer even without adding a peroxide.

The following non-limiting examples illustrate the invention in further detail.

EXAMPLES

General Procedure to Prepare Thermoplastic Compositions

The polyacrylate-impregnated polyolefin was charged to a 30 mm co-rotating intermeshing twin screw extruder, with a 42L/D and a screw designed to provide high shear mixing zones. Additives were dry blended with the polymer prior to addition at a nominal feed rate of 6.8 kg/hr and a screw speed of 200 rpm.

The six heater zones were set (130/170/180/180/180180° C.) to maintain a melt temperature of 188+/−5° C.

Polymer Test Methods

All samples were injection molded into ASTM test bars and tested using test methods:

ASTM D 412—tensile strength/elongation at 8.5 mm/sec.
ASTM D 395—compression set 22 hrs/70° C., and 22 hr/100° C.
ISO 48—hardness
ISO 34—'trouser' tear
ISO 132/3—deMattia Flex Resistance
ASTM D1238—melt flow index 230° C./2.16 kg (gms/10 minutes)

Polymers/Monomers Used

The following materials were used:

PACREL—the polypropylene pellet (described below) was impregnated with the desired amount of acrylate monomer. Pacrel 631—containing 60 weight % of n-butyl acrylate monomer, Triganox 145 peroxide [see below], and 2.2 weight % glycidyl methacrylate was used in the following examples. These monomers were subsequently peroxide polymerized and peroxide crosslinked simultaneously "in-situ".

Polypropylene—a nucleated random copolymer of propylene containing 2.5% ethylene, PP XC 20 76DNA (Borealis Polymers Oy), with a melt flow rate (ASTM D1238) of 20 gm/10 min at 230° C./12.16 Kg n-butyl acrylate, glycidyl methacrylate (Aldrich Chemie GMBH)

2,5-bis(tert-butylperoxy)-2,5-dimethyl-3-hexyne (Triganox 145 Akzo Chemicals, $t_{1/2}$ 10 hr. at 120° C.).

N,N'-m-phenylenedimaleimide, HVA-2, (E.I. DuPont Company)

Lotader 4700—an ethylene copolymer containing 68 weight % ethylene, 30 weight % ethyl acrylate and 2 weight % maleic anhydride—as copolymerized components (Elf Atochem)

Polybond 1002—a 6 weight percent acrylic acid-grafted polypropylene (Uniroyal Chemicals)

Diak #1—hexamethylenediamine carbamate

DPG—diphenylguanidine

Example 1

The experiments in Table 1 show that the addition of a peroxide accelerator, HVA-2, to Pacrel 631 (control 2 [4961]) under the high melt shear conditions of the twin screw compounding extruder leads to the generation of an elastomeric composition having high tensile strength, and high elongation (composition 1-7), plus improved compression set resistance. This is a reflection of an increase in the crosslink density of the polyacrylate phase contained within the Pacrel pellet.

The unexpected improvement in elongation suggests that a covalent grafting reaction has occurred between the polyacrylate and polypropylene phases, accompanied by the distribution of crosslinked polyacrylate rubber particles throughout the continuous polypropylene phase.

The loss in melt flow of sample 1-7 is also indicative that reaction at the polyacrylate/polypropylene interface (as well as polyacrylate crosslinking) has occurred due to the presence of the HVA-2 peroxide accelerator.

This is also supported by the morphology revealed by scanning electron micrograph images which show the rubber particles of samples 1-7 and 2-13 to be well dispersed and firmly attached to the polypropylene matrix. The 'control' shows evidence of the creation of a crater formed by rubber particle dislodgment from the polypropylene matrix (SEM samples 1, 3 and 5).

TABLE 1

| COMPOSITION | 'CONTROL' 2 [4961] | 1-7 |
|---|---|---|
| PACREL 631 | | |
| polypropylene (%) | 40 | 40 |
| polyacrylate (%) | 60 | 60 |
| weight as phr-polyacrylate | | |
| HVA-2 | 0 | 1.2 |
| PROPERTIES | | |
| TENSILE (MPa) | 6.5 | 8.0 |
| ELONGATION (%) | 180 | 220 |
| APPARENT MODULUS (TS/EL) | 0.036 | 0.036 |
| 100% MODULUS (MPa) | 6.1 | 6.7 |
| HARDNESS (Shore A) | 95 | 95 |
| TEAR STRENGTH MD/TD(kN/m) | 14/26 | 15/21 |
| COMPRESSION SET 22 hr/100° C. | 80 | 72 |
| DeMATTIA FLEX (× $10^3$ cycles) | 0.03 | 3 |
| MELT INDEX (230° C./2.16 Kg) | 1.4 | 0.25 |

Control 2 is Pacrel 631 extruded alone

Example 2

Comparative Example for Example 1

Table 2 shows the results of experiments in which attempts were made to crosslink the glycidyl methacrylate-functionalized polyacrylate phase of the Pacrel 631 using conventional diamine, Diak #1/DPG, crosslinking systems recommended for functionalized acrylate copolymers and described in U.S. Pat. No. 4,782,110.

Based on the prior art (U.S. Pat. No. 4,555,546) this diamine system should also react with the epoxide functionality on the polyacrylate phase and the acid-functionalized polypropylene (Polybond 1002) phase to create interfacial adhesion (grafting). The resultant composition should be a soft material with high elongation and good compression set resistance.

Addition of Polybond 1002 (1-5-1) was actually detrimental to the elongation of the Pacrel 'control', indicating that no interfacial adhesion (grafting reaction) had occurred.

With the addition of the diamine cure system (2-6A-1) a more elastomeric material (low compression set and apparent modulus) with high tensile, reasonable elongation, and excellent flex endurance was achieved.

These data, and the observed reduction in melt flow, indicate that some increase in crosslink density of the polyacrylate phase, as well as interfacial adhesion has occurred—but not with as dramatic an effect on elongation as seen with the simple addition of HVA-2 to Pacrel 631 (sample 1-7, Table 1, or 2-13 Table 4).

TABLE 2

| COMPOSITION | CONTROL 2 4961 | CONTROL 3 1-5-1 | 2-6A-1 |
|---|---|---|---|
| PACREL 631 | | | |
| polypropylene (%) | 40 | 40 | 40 |
| polyacrylate (%) | 60 | 60 | 60 |
| POLYBOND 1002 (% of total Pacrel) | 0 | 5 | 5 |
| DIAK #1 | | | 0.36 |
| DPG | | | 2.4 |

TABLE 2-continued

| COMPOSITION | CONTROL 2 4961 | CONTROL 3 1-5-1 | 2-6A-1 |
|---|---|---|---|
| PROPERTIES | | | |
| TENSILE (MPa) | 6.5 | 6.7 | 7.4 |
| ELONGATION (%) | 180 | 110 | 170 |
| APPARENT MODULUS (TS/EL) | 0.036 | 0.061 | 0.043 |
| 100% MODULUS (MPa) | 6.1 | 6.7 | 6.7 |
| HARDNESS (shore A) | 95 | 96 | 95 |
| TEAR STRENGTH MD/TD (kN/m) | 14/26 | 16/24 | 18/25 |
| COMPRESSION SET (22 hr/100° C.) | 80 | 82 | 75 |
| DeMATTIA FLEX ($\times 10^3$ cycles) | 0.03 | 3 | >20 |
| MELT FLOW (230° C./2.16 Kg) | 1.4 | 2.1 | 0.2 |

Diak #1 is hexamethylenediamine carbamate.
DPG is diphenylguanidine

Example 3

Comparative Example for Example 1

Table 3 records the results of attempts to enhance the crosslink density of the polyacrylate phase with HVA-2 accelerator, while at the same time creating interfacial linkages between the polyacrylate (epoxy group) and the acid functionality of the polypropylene/Polybond phase using the diamine reactions described in the prior art (U.S. Pat. No. 4,555,546).

Tin octoate was added as a catalyst for the ring-opening reaction of the epoxide functionality of the glycidyl methacrylate copolymerized into the poly(n-butylacrylate) phase.

The reduction in melt flow in samples 2-7-1 and 2-8 probably reflects the formation of interfacial linkages, but the low elongation indicates that the crosslink density of the polyacrylate phase has not increased. The diamine is clearly interfering with the beneficial effect of the peroxide accelerator (HVA-2), since reducing the diamine level and removing the Polybond (2-17) restored the rubber-like apparent modulus, the high tensile and high elongation, without dramatic loss in melt flow.

This again confirms the unexpected value of the addition of HVA-2 to Pacrel during shear compounding.

TABLE 3

| COMPOSITION | 2-7-1 | 2-8 | 2-17 |
|---|---|---|---|
| PACREL 631 | | | |
| polypropylene (%) | 40 | 40 | 40 |
| polyacrylate (%) | 60 | 60 | 60 |
| POLYBOND 1002 (% of total Pacrel) weight as phr of polyacrylate | 5 | 5 | 0 |
| DIAK #1 | 0.72 | 0.72 | 0.2 |
| DPG | 2.4 | 2.4 | 0.2 |
| HVA-2 | 1.2 | 1.2 | 1.2 |
| TIN OCTOATE | | 0.84 | 0.84 |
| PROPERTIES | | | |
| TENSILE (MPa) | 6.7 | 7.1 | 8.5 |
| ELONGATION (%) | 100 | 140 | 260 |
| APPARENT MODULUS (TS/EL) | 0.067 | 0.051 | 0.033 |
| 100% MODULUS (MPa) | 6.7 | 6.8 | 6.9 |
| HARDNESS (Shore A) | 96 | 97 | 94 |
| TEAR STRENGTH (kN/m) | 20/28 | 22/25 | 24/31 |

TABLE 3-continued

| COMPOSITION | 2-7-1 | 2-8 | 2-17 |
|---|---|---|---|
| COMPRESSION SET % (22 hr/110° C.) | 82 | 81 | 72 |
| DeMATTIA FLEX ($\times 10^3$ cycles) | 4 | 6 | 5 |
| MELT FLOW (230° C./2.16 Kg) | 0.49 | 0.43 | 0.74 |

Example 4

In an attempt to reduce the stiffness of these melt processible multiphase thermoplastic compositions, a soft ethylene plasticizing copolymer (Lotader 4700—ethylene 68/ethyl acrylate 30/maleic anhydride 2—all weight percent) was added to the system. This material is quite compatible with the polypropylene phase of the composition—and requires no compatibilizing additives.

Addition of Lotader 4700 to the 'control 4961', (2-9-1, Table 4), reduces hardness slightly (as measured by low apparent modulus).

A most unexpected and useful result was obtained by the subsequent addition of the peroxide accelerator (2-13). This generates improved compression set resistance and flex durability (DeMattia) as well as achieving the desirable high tensile—at a high degree of elongation—resulting from the increase in crosslink density of the polyacrylate phase—without loss in the composition softness.

Thus the combination of HVA-2 and Lotader 4700 provides surprising elastomeric qualities to the Pacrel—superior to that observed previously with HVA-2 alone (example 1-7, Table 4).

Dramatic increase in tear resistance and flex fatigue (DeMattia) resistance plus a decrease in the melt flow behavior of 2-13 is evidence for the generation of interfacial adhesion between the polyacrylate and polypropylene phases through the action of the HVA-2 peroxide accelerator.

TABLE 4

| COMPOSITION | CONTROL 2 4961 | 2-9-1 | 2-13 | 1-7 |
|---|---|---|---|---|
| PACREL 631 | | | | |
| polypropylene (%) | 40 | 40 | 40 | 40 |
| polyacrylate (%) | 60 | 60 | 60 | 60 |
| LOTADER 4700 (% of total Pacrel) | | 5 | 5 | |
| HVA-2 | | | 1.2 | 1.2 |
| PROPERTIES | | | | |
| TENSILE (MPa) | 6.5 | 6.7 | 9.6 | 8.0 |
| ELONGATION (%) | 180 | 210 | 350 | 220 |
| APPARENT MODULUS (TS/EL) | 0.036 | 0.032 | 0.027 | 0.036 |
| 100% MODULUS (MPa) | 6.1 | 6.0 | 6.8 | 6.7 |
| HARDNESS (shore A) | 95 | 92 | 91 | 95 |
| TEAR STRENGTH (kN/m) MD/TD | 14/26 | 18/28 | 21/32 | 18/24 |
| COMPRESSION SET (22 hr/100° C.) | 80 | 83 | 71 | 72 |
| DeMATTIA FLEX ($\times 10^3$ cycles) | 0.03 | 5 | 11 | 3 |
| MELT FLOW (230° C./2.16 Kg) | 1.4 | 1.6 | 0.15 | 0.25 |

Example 5

Comparative Example for Example 4

Because of the unexpected results recorded in Example 4, the addition of an acid functionalized polypropylene to the Pacrel 631 was explored as a potential site for reaction of the peroxide/HVA-2 accelerator system, or as a site for creating interfacial bonds with the epoxy function of the polyacrylate phase of the Pacrel (see Comparative Example 2).

Table 5 shows that the addition of the acid-functionalized polypropylene (Polybond 1002) to the 'control' (1-6, 1-9 vs. 1-7) has a detrimental effect on the stiffness (apparent modulus)of samples 1-6 and 1-9, with no benefit to elongation.

The addition of HVA-2 to the Polybond-containing Pacrel (samples 1-6, 1-9 and 2-15 vs 1-5) maintains the elastomeric character of the 'control' composition 1-7 (tear strength and compression set resistance) as a result of the HVA-2 accelerator- generated higher crosslink density in the polyacrylate phase. It is also evident that this combination of HVA-2 and the acid-functionalized Polybond greatly enhances the flex fatigue resistance probably as a result of interaction between the HVA-2 and the acid-functionality on the Polybond. Specifically, the physical property improvement of 2-15 relative to 1-7 (high elongation at a high tensile strength and high flex fatigue endurance level) reflects the formation of HVA-2 induced interfacial adhesion between the polyacrylate and polypropylene phases.

TABLE 5

| COMPOSITION (phr-polyacrylate) | 'CONTROL' 1-7 | 'CONTROL' 1-5-1 | 1-6 | 1-9 | 2-15 |
|---|---|---|---|---|---|
| PACREL 631 | | | | | |
| polypropylene (%) | 40 | 40 | 40 | 40 | 40 |
| polyacrylate (%) | 60 | 60 | 60 | 60 | 60 |
| POLYBOND 1002 (% of tot. Pacrel) | 0 | 5 | 5 | 10 | 5 |
| HVA-2 (% of total Pacrel) | 1.2 | | 1.2 | 1.2 | 0.6 |
| PROPERTIES | | | | | |
| TENSILE (MPa) | 8.0 | 6.7 | 8.5 | 9.3 | 8.9 |
| ELONGATION (%) | 220 | 110 | 210 | 200 | 270 |
| APPARENT MODULUS (TS/EL) | 0.036 | 0.061 | 0.040 | 0.047 | 0.033 |
| 100 % MODULUS (MPa) | 6.7 | 6.7 | 7.3 | 8.0 | 7.2 |
| HARDNESS (shore A) | 95 | 96 | 87 | 95 | 95 |
| TEAR STRENGTH MD/TD (kN/m) | 15/21 | 16/24 | 17/25 | 16/25 | 16/26 |
| COMPRESSION SET 22 hr/100° C. | 72 | 82 | 75 | 72 | 77 |
| DeMATTIA FLEX (× 10³ cycles) | 3 | 3 | >20 | >20 | >20 |
| MELT INDEX (230° C./2.16 Kg) | 0.25 | 2.10 | 0.50 | 0.71 | 0.77 |

Example 6

The addition of a combination of diamine cure system and maleic anhydride-containing ethylene copolymer (Lotader) to Pacrel (Examples 2-10 thorugh 2-12, Table 6) generated elastomeric low melt flow compositions with characteristics of both interfacial adhesion and improved crosslink density of the acrylate phase. The Polybond "control" (sample 2-16) did not.

Addition of HVA-2 peroxide accelerator to the diamine/Lotader system (2-14) provided unexpectedly high flex durability (deMattia) with very low melt flow (although still melt processible in conventional injection molding equipment).

None of these compositions achieved the balance of low compression set resistance, flex durability, elongation and tensile performance of the diamine-free composition (Example 2-13). This balance is achieved by the simple combination of HVA-2 and Lotader.

TABLE 6

| COMPOSITION | 2-10 | 2-11 | 2-12 | 2-16 | 2-14 | 2-13 |
|---|---|---|---|---|---|---|
| PACREL 631 | | | | | | |
| polypropylene (%) | 40 | 40 | 40 | 40 | 40 | 40 |
| polyacrylate (%) | 60 | 60 | 60 | 60 | 60 | 60 |
| LOTADER 4700 (of total Pacrel) | 5 | 5 | 5 | | 5 | 5 |
| POLYBOND 1002 (of total Pacrel) weight as phr | | | | 5 | | |
| polyacrylate | | | | | | |
| DIAK #1 | 0.2 | 0.2 | 0.2 | 0.2 | 0.2 | |
| DPG | | 0.2 | 0.2 | 0.2 | 0.2 | |
| HVA-2 | | | | | 1.2 | 1.2 |
| TIN OCTOATE | | | 0.84 | 0.84 | 0.84 | |
| PROPERTIES | | | | | | |
| TENSILE (MPa) | 7.4 | 7.4 | 8.1 | 8.0 | 8.9 | 9.6 |
| ELONGATION (%) | 300 | 290 | 280 | 180 | 280 | 350 |
| APPARENT MODULUS (TS/EL) | 0.025 | 0.026 | 0.029 | 0.044 | 0.032 | 0.027 |
| 100% MODULUS (MPa) | 6.0 | 6.0 | 6.4 | 7.1 | 6.8 | 6.8 |
| HARDNESS (shore A) | 95 | 95 | 94 | 96 | 95 | 91 |
| TEAR STRENGTH MD/TD (kN/m) | 14/23 | 15/21 | 16/23 | 13/19 | 14/25 | 22/32 |
| COMPRESSION SET (22 hr/100° C.) | 83 | 80 | 79 | 93 | 75 | 71 |
| DeMATTIA FLEX (× 10³ cycles) | 7 | 6 | 7 | 5 | >20 | 11 |
| MELT FLOW (230° C./2.16 Kg) | 0.36 | 0.45 | 0.23 | 0.40 | 11.7* | 0.15 |

*This melt flow of 11.7 gm./10 min. for sample 2–14 required a 12.6 kg weight — however this composition was easy to injection mold.
The terms and expressions which have been employed are used as terms of description and not of limitation, and there is no intention in the use of such terms and expressions of excluding any equivalent of the features shown and described or portions thereof, it being recognized that various modifications are possible within the scope of the invention.

The terms and expressions which have been employed are used as terms of description and not of limitation, and there is no intention in the use of such terms and expressions of excluding any equivalent of the features shown and described or portions thereof, it is being recognized that various modifications are possible within the scope of the invention.

What is claimed is:

1. A process for preparing a polymer blend comprising: compounding the blend by melt processing, said blend comprising a first phase of a polyacrylate polymer prepared by radical polymerization and a source of radicals, and a second phase containing a polyolefin polymer, and retarding termination reactions of free radicals from the source of radicals during compounding in order to promote formation of crosslinks in the polyacrylate phase.

2. The process of claim 1, wherein the termination of reactions of the radicals are retarded to improve the elastomeric properties of the polymer blend.

3. The process of claim 1, wherein the termination reactions of the radicals are retarded in order to enhance interfacial adhesion between the polyacrylate phase and the polyolefin phase.

4. The process of claim 1, wherein the source of radicals comprises a peroxide.

5. The process of claim 1, wherein the source of radicals comprises residual unreacted radicals from radical polymerization.

6. The process of claim 1, wherein the termination reactions of the unreacted radicals are retarded by introducing a peroxide accelerator into the blend formed by the first and the second polymer phase before melt blending thereof.

7. The process of claim 6, wherein the peroxide accelerator is selected from the group consisting of N,N'-m-phenylene-dimaleimide, trimethylolpropane, trimethacrylate, ethylene glycol dimethacrylate, zinc diacrylate, 1,2-polybutadiene, 1,2-polybutadiene/styrene copolymer, triallylcyanurate, triallylisocyanurate, and triallylmellitate.

8. The process of claim 7, wherein the N,N'-m-phenylenedimaleimide is added in an amount of 0.1 to 15 phr (parts per hundred parts of rubber), calculated from the weight of the elastomeric acrylic rubber component of the polymer blend.

9. The process of claim 1, wherein the polyacrylate/polyolefin blend is compatibilized.

10. The process of claim 9, wherein the blend is compatilized by introducing a material which interacts with the free radicals generated from unreacted peroxide contained in the polyacrylate phase into the blend formed by the first and second polymer before melt blending thereof.

11. The process of claim 10, wherein the material is an ethylene-acrylate-co/terpolymer.

12. The process of claim 10, wherein the material contains functional groups which are capable of reacting with functional groups in the polyacrylate phase.

13. The process of claim 12, wherein the material contains functional groups selected from the group of acid, acid anhydride and epoxy group, which are capable of reacting with epoxy, acid or acid anhydride groups, respectively, of the polyacrylate phase.

14. The process of claim 13, wherein the polyacrylate phase contains glycidyl acrylate or glycidyl methacrylate groups and the compatibilizer contains maleic anhydride groups.

15. The process of claim 10, wherein the material is added in an amount of 0.1 to 15 phr (parts per hundred parts of rubber), calculated from the weight of polyarcylate rubber contained in the polymer blend.

16. The process of claim 1, wherein the compounded polymer blend is produced having higher tear and flex fatigue resistance, lower compression set, tensile set and swell in oil and gasoline than a corresponding blend, wherein the termination reactions of residual radicals in the polyacrylate phase have not been retarded.

17. The process of claim 16, wherein the compression set of the polymer blend is at least 5% lower than that of a corresponding blend, wherein the termination reactions of residual radicals in the polyacrylate phase have not been retarded.

18. The process of claim 1, wherein the polymer blend of a polyacrylate phase and a polyolefin phase is produced by polymerizing, grafting and crosslinking acrylate monomers in a polyolefin matrix.

19. The process of claim 18, wherein polymerization, grafting and crosslinking are carried out in a solid polyolefin matrix.

20. The process of claim 19, wherein the acrylate monomer comprises butylacrylate containing diacrylate, glycidyl acrylate and/or glycidyl methacrylate groups.

21. The process of claim 17, wherein a peroxide compound is introduced into the polyolefin matrix to provide polymerization, grafting and crosslinking of the acrylate monomers.

22. The process of claim 1, wherein the polyolefin phase comprises polyethylene, polypropylene or copolymers thereof.

23. The process of claim 1, wherein the polymer blend comprises:
   15 to 75 parts by weight of a polyolefin comprising polymerized monomer units of ethylene or propylene or mixtures thereof forming the continuous phase of the blend, and
   85 to 25 parts by weight of a partially crosslinked polyacrylate elastomer consisting essentially of units derived from an alkyl ester of acrylic or methacrylic acid, wherein the alkyl group contains 1 to 10 carbon atoms, and a chemically functionalized acrylate, forming the discontinuous phase of the bland.

24. The process of claim 1, wherein N,N'-m-phenylenedimaleimide is added to the polymer blend together with an ethylene-ethylacrylate-maleic anhydride-terpolymer and optionally hexamethylenediamine carbonate and/or diphenylguanidine.

25. The process of claim 24, further comprising adding tinoctoate to the polymer blend.

* * * * *